(12) United States Patent
Dehmlow

(10) Patent No.: US 6,473,240 B1
(45) Date of Patent: Oct. 29, 2002

(54) APPARATUS AND METHOD FOR USING ORTHOGONALLY POLARIZED LIGHT IN PROJECTION COCKPIT DISPLAYS

(75) Inventor: Brian P. Dehmlow, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 177 days.

(21) Appl. No.: 09/665,324

(22) Filed: Sep. 19, 2000

(51) Int. Cl.[7] .......................... G02B 27/14; G02F 01/03
(52) U.S. Cl. ........................ 359/630; 359/245
(58) Field of Search ................. 359/630, 631, 359/633, 497, 245, 246; 345/7, 8, 9, 38; 362/11, 27; 349/18, 30, 96; 356/368

(56) References Cited

U.S. PATENT DOCUMENTS 5,283,600 A * 2/1994 Imai ............................ 353/34
5,572,363 A * 11/1996 Fergason ................... 359/630
5,963,532 A * 10/1999 Hajjar ........................ 369/112

OTHER PUBLICATIONS

Co-pending patent application Docket No. 00CR024/KE entitled "Apparatus And Method For Integrating Light From Multiple Light Sources" filed on an even date, inventor B. Dehmlow.

* cited by examiner

Primary Examiner—Ricky Mack
Assistant Examiner—Omar Z. Hindi
(74) Attorney, Agent, or Firm—Nathan O. Jensen; Kyle Eppele

(57) ABSTRACT

An apparatus and method for illuminating a tiled projection display which includes a first polarizing beam splitting prism which separates incident light into two beams of orthogonally polarized light, where one of the beams is directed to a first LCD, and the other is caused to cross over to and illuminate an adjacent LCD.

20 Claims, 2 Drawing Sheets

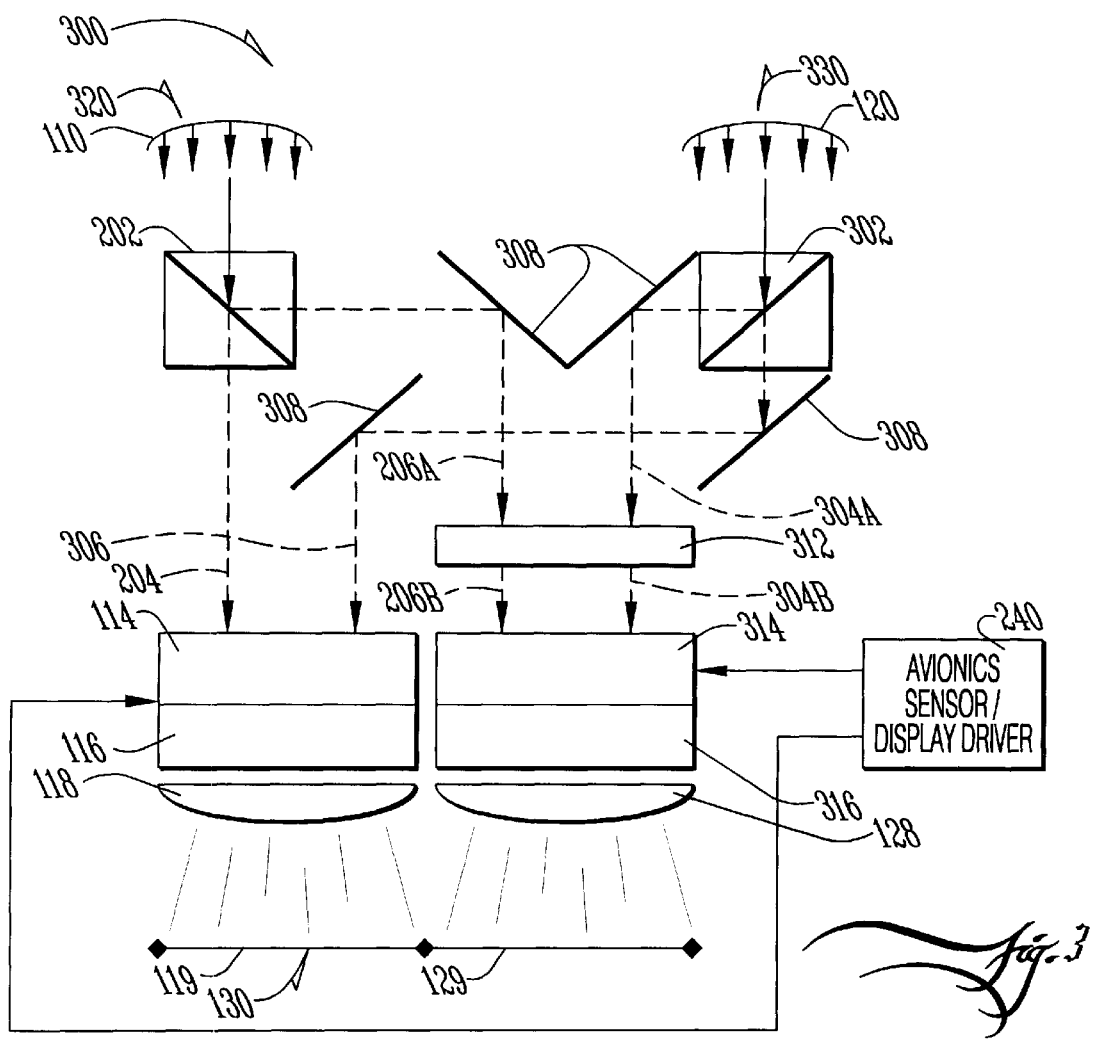

APPARATUS AND METHOD FOR USING ORTHOGONALLY POLARIZED LIGHT IN PROJECTION COCKPIT DISPLAYS

CROSS REFERENCE TO RELATED APPLICATION

This application relates to co-pending application entitled "APPARATUS AND METHOD FOR INTEGRATING LIGHT FROM MULTIPLE LIGHT SOURCES IN PROJECTION COCKPIT DISPLAYS" filed on even date herewith by the same inventor and assigned to a common assignee.

FIELD OF THE INVENTION

The present invention generally relates to projection cockpit displays, and even more particularly relates to such displays having multiple tiled display surfaces.

BACKGROUND OF THE INVENTION

In the past, designers of avionics displays have endeavored to provide projection displays with ever-increasing image quality, reliability, and economic efficiency. Projection displays based on liquid crystal display (LCD) technology generally use a single, linear polarization state for light incident upon the display element. Typically, this is accomplished by the use of a linearly polarizing filter, prism, or reflector disposed in front of the LCD device. Linearly polarizing filters, prisms, and reflectors are all well known in the art. These polarizing devices typically transmit one linear polarization state, while a second orthogonal polarization state is either reflected into a different path, or absorbed within the polarizing element. In either case, the state which is not transmitted becomes unusable by the display. This results in a significant (typically greater than 50 percent) attenuation of the light flux which is usable by the display.

In the past, display designers have proposed methods and devices to capture and reuse the otherwise discarded orthogonally polarized light and direct it into the display device, along with the polarized light originally produced from the incident light. These devices have been called "polarization recovery devices", which are typically an array of prisms and half-wave retarders which divide the light into two polarization states, rotate one polarization state by 90 degrees, then recombine the now parallel polarization states. These "polarization recovery devices" have found limited acceptance in the LCD projector industry because they are quite expensive to fabricate, and they can also result in significant other performance deficiencies.

Consequently, there exists a need for improvement in illumination of tiled projection displays.

SUMMARY OF THE INVENTION

It is an object of the present invention to provide tiled projection displays having a superior image luminance characteristic.

It is a feature of the present invention to utilize multiple tiled viewing surfaces which receive illumination through the same front-end polarizer.

It is another feature of the present invention to utilize a polarizing prism or reflector as the front-end polarizer.

It is an advantage of the present invention to optically divide light from a single light source and use the divided light through multiple LCDs.

It is another feature of the present invention to include a half wave retarder to rotate the polarization state of light directed to an adjacent LCD.

It is another advantage of the present invention to increase commonality of component parts by having the same polarization state for all light incident on the LCDs in both optical channels in pairs of tiled projection displays.

The present invention is an apparatus and method for illuminating tiled projection displays designed to satisfy the aforementioned needs, provide the previously stated objects, include the above-listed features, and achieve the already articulated advantages. The present invention is carried out in an efficient manner that wastes less light flux than is typically done when an absorbing polarization filter is used to provide linearly polarized light.

Accordingly, the present invention is a tiled projection display system which utilizes a tiled multi-viewing surface display where multiple viewing segments are illuminated by light, which has been conditioned by the same polarizing device prior to its passing through separate liquid crystal display (LCD) devices.

BRIEF DESCRIPTION OF THE DRAWINGS

The invention may be more fully understood by reading the following description of the preferred embodiments of the invention, in conjunction with the appended drawing wherein:

FIG. 3 is a simplified block diagram of a system of the present invention which includes two input polarization beam splitters where output from each is shared with two LCDs.

DETAILED DESCRIPTION

Figure 1:
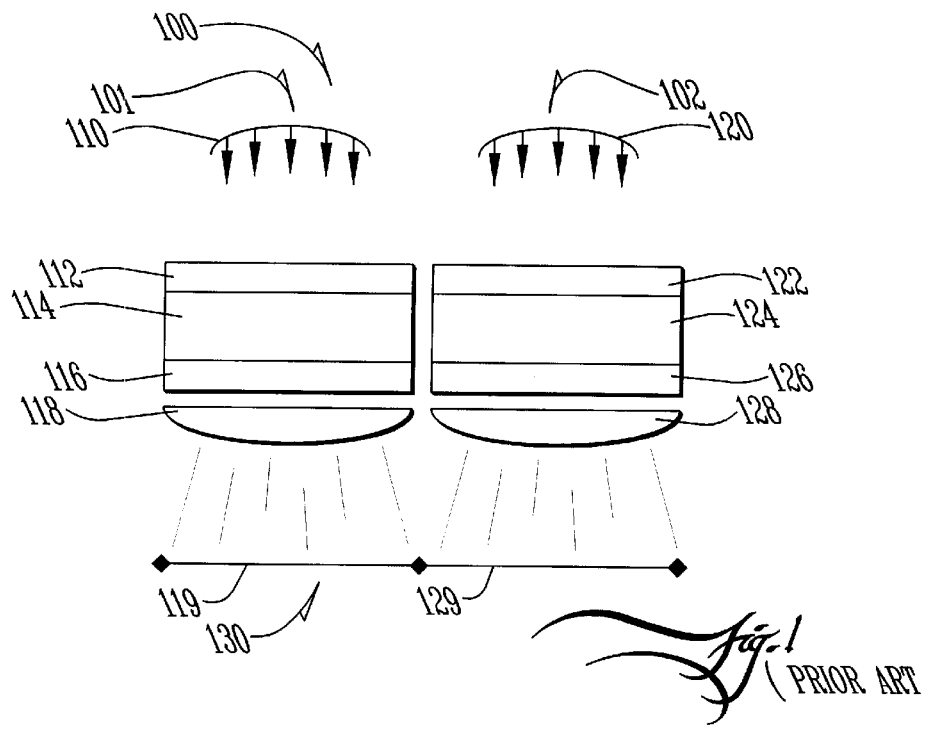
FIG. 1 is a simplified block diagram of a tiled projection display system of prior art which uses two polarization recovery devices.

Now referring to the drawings wherein like numerals refer to like matter throughout, there is shown a system of the prior art, generally designated 100, having a tiled projection display system 100 having a first light source 110 and a second light source 120, which are well known in the art for illuminating projection LCDs.

The light from first light source 110 and second light source 120 is incident upon first polarization recovery device 112 and second polarization recovery device 122, respectively. These devices are arrays of miniature prism and half wave retarder combinations which separate the incident light into two linear polarization states, allow the first state to pass through and further process the second state so as to be converted by the half wave retarder into the light having the first polarization state and then be redirected so as to be combined with the light of the first polarization state which was originally passed. As stated above, these polarization recovery devices are expensive and often exhibit other undesirable performance qualities.

First liquid crystal cell 114 and second liquid crystal cell 124 are well known in the art, as are first exit polarizer 116, second exit polarizer 126, first projection optics 118, and second projection optics 128. These well-known components are used to provide a two-channel tiled display where the first channel 101 provides a display on the first viewing surface segment 119 of unified tiled displays viewing surface 130, and the second channel 102 provides a display on second viewing surface segment 129 of unified tiled displays viewing surface 130. The two channels are essentially identical except that the drive signals applied to first liquid crystal cell 114 and second liquid crystal cell 124 are different so as to produce different images.

The term "tiled display" is used herein to refer to a display system where two or more distinct display surfaces are located immediately adjacent to each other, and each display surface is controlled by its own display modulation device (e.g. LCD, etc.). However, each display surface is caused to display a segment of a larger image, such that a viewer sees one continuous image across the two rearwardly distinct display surfaces.

Figure 2:
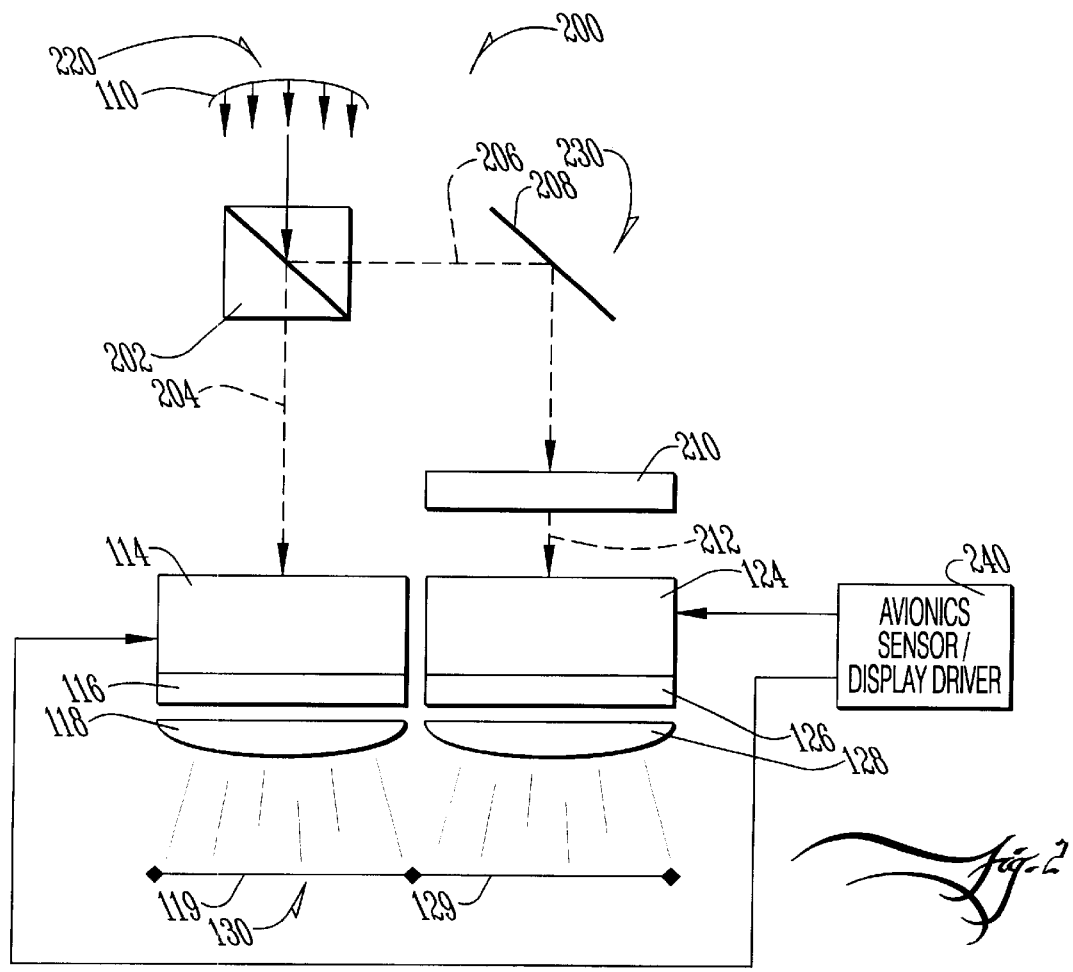
FIG. 2 is a simplified block diagram of a system of the present invention, including a single input polarization beam splitter and two LCDs.

Now referring to FIG. 2, there is shown a display system of the present invention generally designated 200. The system 200 includes a first light source 110 which illuminates a first polarizing beam splitting prism 202. First polarizing beam splitting prism 202 is well known in the art as a MacNeille-type prism.

First polarizing beam splitting prism 202 performs the function of producing P polarized light 204 directed toward the first liquid crystal cell 114 and polarized light 206, which is directed away from first liquid crystal cell 114 and toward a mirror 208, which reflects this light into a half wave retarder 210. Half wave retarder 210 is well known in the art. The output of half wave retarder 210 is a P polarized light 212, which is converted from S polarized light.

The P polarized light converted from S polarized light 212 may be thought of as recaptured or recovered light in the sense that often the light which is orthogonal to light passed by a front-end polarizer, is lost and unusable. After the S polarized light 206 is passed through half wave retarder 210, then all light incident upon either the first liquid crystal cell 114 or second liquid crystal cell 124 is P polarized light. This allows for the remainder of each channel 220 and 230 to utilize identical components. Also shown is an avionics sensor/display driver 240, which could be any combination of known avionics equipment which provides signals which are representative of operational characteristics of an aircraft while in flight, such as attitude displays, navigation equipment, weather radar etc. Either avionics sensor/display driver 240 or another intermediate device provides manipulation of the aviation related signals to signals which are ready for use by an LCD device.

Another embodiment of the present invention is shown in FIG. 3, which is generally designated 300, which includes a dual lamp, dual channel, and dual light cross-over approach. First channel 320 is similar to that shown in FIG. 2 except that the first polarizing beam splitting prism 202 is adapted and configured so that the S polarized light 206A is directed to mirror 308, and subsequently into half wave retarder 312. The output of half wave retarder 312 is a P polarized light 206B, which is converted from S polarized light. The remainder of first channel 320 is similar to first channel 101 of FIG. 1 and first channel 220 of FIG. 2. Second channel 330 is similar to that shown in FIG. 2 except that the second polarizing beam splitting prism 302 is adapted and configured so that the S polarized light 304A is directed to mirror 308, and subsequently into half wave retarder 312. The output of half wave retarder 312 is a P polarized light 304B, which is converted from S polarized light. P polarized light 306 from prism 302 is directed by mirrors 308 toward the first liquid crystal cell 114.

In operation, the apparatus and method of the present invention could function as follows:

For the single lamp configuration of FIG. 2, light is emitted by first light source 110. It is conditioned by first polarizing beam splitting prism 202 so that P polarized light 204 is directed to first liquid crystal cell 114, and the S polarized light 206 is directed to the adjacent section of the tiled display where it is reflected by mirror 208 into half wave retarder 210, which converts the S polarized light into P polarized light converted from S polarized light 212. In this design, only one lamp is needed to illuminate two adjacent tiled display sections.

With respect to the dual lamp configuration of FIG. 3, light is provided by first light source 110 and second light source 120. This light is incident upon first polarizing beam splitting prism 202 and second polarizing beam splitting prism 302, respectively. The first channel 320 passes P polarized light and reflects the S polarization state over to the second channel 330. Second channel 330 passes the S polarization state and reflects the P polarized light across to the first channel 320. With the use of appropriately positioned mirrors 308 in each channel, polarized light which is not used by one adjacent channel is crosscoupled and used to increase the luminance of the other adjacent channel. If either source 110 or 120 fails, both channels remain active, but at a reduced luminance.

While the above description refers to avionics projection displays and to LCDs, this is done because it is believed that the benefits of the present invention will be readily apparent in such cases. It is not the intention of the present invention to be limited to avionics projection displays and LCDs, but it should extend to any type of display where the advantage of the present invention can be utilized.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

I claim:

1. An apparatus for projecting a tiled image in an aircraft cockpit comprising:

a plurality of lamps for generating light;

a plurality of adjacent display surfaces each having a display surface image viewing area thereon, with a projector side and a viewing side;

a plurality of electro-optical light modulating devices, which are each optically coupled to at least two of said plurality of lamps and electrically coupled to and responsive to signals from sensors on an aircraft, said electro-optical light modulating devices generate images having a predetermined modulating device image size;

a lens disposed between said electro-optical light modulating devices and said projector sides of said display surfaces for causing an enlargement of said images from said predetermined modulating device image size to a size of said display surface image viewing area;

a viewable image is caused to be formed on said viewing side of said display surface in response to light which is generated by said plurality of lamps, modulated by said electro-optical modulating device, and enlarged by said lens;

a first polarizing beam splitting prism and a second polarizing beam splitting prism disposed between said plurality of lamps and said plurality of electro-optical light modulating devices; and, said first polarizing beam splitting prism and said second polarizing beam splitting prism adapted and configured for sharing linearly polarized light for use on adjacent electro-optical light modulating devices in said plurality of electro-optical light modulating devices.

2. An apparatus of claim 1 further comprising:

a plurality of mirrors disposed between said plurality of lamps and said plurality of electro-optical light modulating devices.

3. An apparatus of claim 2 wherein each of said plurality of electro-optical light modulating devices have coupled thereto an exit polarizer, which passes a polarization state which is parallel with respect to a polarization state passed by an exit polarizer coupled to an adjacent one of said electro-optical light modulating devices.

4. A tiled projection display comprising:

a first light source, a second light source, means for separating incident light into two divergent beams of orthogonally polarized light;

a first liquid crystal cell adapted and configured to receive illumination by a first of said two divergent beams of orthogonally polarized light;

first projection optics optically coupled with said first liquid crystal cell, said first projection optics causing an image generated by said first liquid crystal cell to be projected upon a first viewing surface segment of a unified tiled display viewing surface;

a second liquid crystal cell adapted and configured to receive illumination from light originating from a second of said two divergent beams of orthogonally polarized light; and, second projection optics optically coupled with said second liquid crystal cell, said second projection optics causing an image generated by said second liquid crystal cell to be projected upon a second viewing surface segment of said unified tiled display viewing surface.

5. An apparatus of claim 4 wherein said means for separating comprises a first polarizing beam splitting prism;

and further comprising a means for redirecting a second of said two divergent beams of orthogonally polarized light;

a half wave retarder for changing a polarization state of said second of said two divergent beams of orthogonally polarized light and thereby creating a recaptured beam of light.

6. An apparatus of claim 5 wherein said first polarizing beam splitting prism is a MacNeille prism.

7. An apparatus of claim 5 wherein said means for redirecting is a mirror.

8. An apparatus of claim 4 wherein said first polarizing beam spliffing prism is a MacNeille prism.

9. An apparatus of claim 4 wherein said first liquid crystal cell is electrically coupled to and receiving drive signals from an avionics sensor/display driver device outputting signals which are representative of operational characteristics of an aircraft in flight.

10. An apparatus of claim 7 wherein said first liquid crystal cell is electrically coupled to and receiving drive signals from an avionics sensor/display driver device outputting signals which are representative of operational characteristics of an aircraft in flight.

11. An apparatus of claim 10 wherein said first liquid crystal cell and said second liquid crystal cell each has coupled thereto an exit polarizer which is configured for passing light, having common polarization states.

12. An apparatus of claim 11 wherein said first liquid crystal cell is an AMLCD.

13. An apparatus of claim 4 wherein said first light source is an incandescent lamp.

14. An apparatus of claim 4 wherein said first light source is an arc discharge lamp.

15. A method of providing a display of information comprising the steps of:

providing a first and second incident light sources;

separating said incident light into a plurality of divergent beams of light, each having a different polarization state;

modulating light having an origin in a first of said plurality of divergent beams of light to generate a first image;

modulating light having an origin in a second of said plurality of divergent beams of light to generate a second image; and, projecting said first image and said second image on adjacent sections of a unified viewing surface.

16. A method of claim 15 further comprising a step of rotating a polarization state of one of said plurality of divergent beams of light.

17. A method of claim 15 wherein said step of separating comprises steps of:

passing light through a first polarizing beam splitting prism; and, reflecting light output from said first polarizing beam splitting prism.

18. A method of claim 17 wherein said step of modulating light having an origin in a first of said plurality of divergent beams, is responsive to receipt of drive signals from an avionics sensor, where said drive signals are representative of an operational characteristic of an aircraft in flight.

19. A method of claim 15 wherein said step of projecting includes steps of:

providing a lens, disposed between a liquid crystal cell and a viewing surface, wherein said lens is not adjacent to said viewing surface; and, diverging light from said liquid crystal cell so as to create an image on said viewing surface which is larger than a largest planar surface area of said liquid crystal cell.

20. A method of claim 18 wherein said step of projecting includes steps of:

providing a lens, disposed between a liquid crystal cell and a viewing surface, wherein said lens is not adjacent to said viewing surface; and, diverging light from said liquid crystal cell so as to create an image on said viewing surface which is larger than a largest planar surface area of said liquid crystal cell.

* * * * *